(12) United States Patent
Michaels

(10) Patent No.: US 10,976,169 B2
(45) Date of Patent: Apr. 13, 2021

(54) WIRELESS NAVIGATION APPARATUS, METHOD, AND SYSTEM

(71) Applicant: Christopher Michaels, Reno, NV (US)

(72) Inventor: Christopher Michaels, Reno, NV (US)

( * ) Notice: Subject to any disclaimer, the term of this patent is extended or adjusted under 35 U.S.C. 154(b) by 0 days.

(21) Appl. No.: 15/396,768

(22) Filed: Jan. 2, 2017

(65) Prior Publication Data

US 2017/0146352 A1    May 25, 2017

Related U.S. Application Data

(63) Continuation of application No. PCT/US2015/041074, filed on Jul. 20, 2015.

(60) Provisional application No. 62/027,586, filed on Jul. 22, 2014.

(51) Int. Cl.
| | | |
|---|---|---|
| G01C 21/34 | (2006.01) | |
| G01C 21/26 | (2006.01) | |
| G01C 21/36 | (2006.01) | |
| G01S 19/45 | (2010.01) | |

(52) U.S. Cl.
CPC .......... *G01C 21/343* (2013.01); *G01C 21/26* (2013.01); *G01C 21/3629* (2013.01); *G01C 21/3644* (2013.01); *G01C 21/3673* (2013.01); *G01S 19/45* (2013.01)

(58) Field of Classification Search
None
See application file for complete search history.

(56) References Cited

U.S. PATENT DOCUMENTS

| | | | |
|---|---|---|---|
| 8,346,279 B1 | 1/2013 | Saatchi | |
| 8,930,135 B2* | 1/2015 | Abramovich Ettinger | ................. G01C 21/3644 701/450 |
| 2006/0136173 A1* | 6/2006 | Case, Jr. | ................. A63B 24/00 702/182 |
| 2007/0069923 A1* | 3/2007 | Mendelson | ........ G06Q 30/0239 340/988 |
| 2008/0244289 A1 | 10/2008 | LeProwse | |
| 2010/0088190 A1* | 4/2010 | Fliess | ..................... G06Q 30/06 705/26.1 |
| 2010/0228469 A1 | 9/2010 | Varadarajan | |
| 2013/0009460 A1* | 1/2013 | Speach | ................... B60R 11/02 307/9.1 |
| 2013/0035149 A1* | 2/2013 | Oakes | ..................... G07F 17/32 463/17 |
| 2013/0073988 A1 | 3/2013 | Groten | |
| 2014/0142842 A1* | 5/2014 | Knobel | .............. G01C 21/3614 701/410 |

(Continued)

OTHER PUBLICATIONS

International Preliminary Report on Patentability dated Oct. 9, 2015 in PCT/US2015/041074.

(Continued)

*Primary Examiner* — Nicholas K Wiltey

(57) ABSTRACT

A wireless navigation system with automatic guidance to the final destination/routes capable of operating in Internet-dead zones includes a system of servers containing data of final destinations/routes, Google and/or Apple Maps API, a voice synthesizer server, a GPS/AGPS system of satellites, servers and processing stations, a set of sensors, a microprocessor, a standard mobile operating system, a supra operating system controlling the above systems and a display and sound system for displaying the final output of the system.

1 Claim, 7 Drawing Sheets

(56) References Cited

U.S. PATENT DOCUMENTS

2014/0260704 A1* 9/2014 Lloyd .................. B81C 1/0023
73/865.8
2016/0003621 A1* 1/2016 Koenig .............. G01C 21/3682
701/31.4

OTHER PUBLICATIONS

International Search Report dated Oct. 9, 2015 in PCT/US2015/041074.
Written Opinion dated Oct. 9, 2015 in PCT/US2015/041074.

* cited by examiner

WIRELESS NAVIGATION APPARATUS, METHOD, AND SYSTEM

CROSS-REFERENCE TO RELATED APPLICATIONS

The present application is a continuation of, and claims priority to, PCT/US2015/041074 filed on Jul. 20, 2015, which claims benefit of U.S. Provisional Application No. 62/027,586, filed on Jul. 22, 2014, the contents of which are hereby incorporated by reference in its entirety.

BACKGROUND

Current wireless systems of navigation such as the turn-by-turn navigation systems offered by dedicated GPS navigation devices including Garmin car navigators, and TomTom car navigators, and GPS capable mobile phones such as Nokia smartphones, Windows phones, Android smart phones, Apple iPhones, used with software/applications such as Google/Apple maps, provide directions for final destinations selected by users. These systems keep users up-to-date about the best (in terms of time, speed or absence of roadblocks) route to a destination and are often updated according to changing factors such as traffic and road conditions.

SUMMARY

An objective of this disclosure is to equip a wireless device with an automatic guidance functionality to guide a user to a final destination via routes designed by local experts.

Another objective of this disclosure is to provide automatic guidance that is not necessarily dependent on Internet connectivity.

Yet another objective is to provide an integrated automatic guidance system in which the location of the user and the direction to be followed can be integrated on a single map and screen.

Yet another objective of the present disclosure is to provide a system comprising operating systems, servers and sensors to catalog, store, process, measure, landmark and display on wireless devices final destinations/routes designed by local experts that would be of public interest. The destinations/routes can be checked for consistency by experts. The routes can be segmented; the starts and ends of the segments can be identified by landmark photos; length of each segment can be measured, for the ease of navigation and the convenience of the user.

Disclosed herein provides a wireless automatic navigation system. The wireless automatic navigation system may comprise a destination and route database server; a web mapping server; a navigation module; an array of sensors; a microprocessor; a mobile operating system; a supra operating system; and a display and sound module for displaying the output of the navigation system.

In some embodiments of the wireless automatic navigation system, the web mapping server may contain API data from a web mapping service application, such as Google Maps, Apple Maps, Yahoo! Maps, Bing Maps, MapQuest, OpenStreetMap, or Nokia Here.

In some embodiments of the wireless automatic navigation system, the navigation module may receive positional information from positioning/navigation satellites such as GPS, GLONASS, COMPASS, Galileo, or IRNSS. Yet in some embodiments, the navigation module may further receive positional information from A-GPS mobile stations.

In some embodiments of the wireless automatic navigation system, the array of sensors comprise a magnetometer sensor, a gyroscope sensor, an accelerometer sensor, a light sensor, a microphone sensor, a proximity sensor, a pressure sensor. In some other embodiments of the system, the array of sensors may further comprise a chemical sensor.

In some embodiments of the wireless automatic navigation system, the mobile operating system may be Android, Symbian, Apple iOS, BlackBerry, MeeGo, Windows Phone, or Bada.

In some embodiments, the wireless automatic navigation system may further comprise a voice synthesizer server.

This disclosure also provides an automatic guidance method that employs a wireless automatic navigation system as mentioned above. The method may comprise the steps of:
1) obtaining a destination, a route and landmarks from a destination and route database server, and overlaying the destination, the route and the landmarks upon a standard mapping application, identifying the GPS coordinates for where the landmarks are located, assigning serial numbers to the landmark identifiers, and calculating the length of each segment from where the user is located in real-time to the said landmark identifiers under control of a supra operating system;
2) receiving signals via a navigation module and employing an array of sensors to determine a GPS location of a wireless device employing said wireless automatic navigation system on an area;
3) relating the GPS location to the route and displaying a pointer on the standard mapping application, said pointer indicating a direction from the GPS location to a next landmark along the route;
4) aligning the wireless device with the pointer while moving towards the next landmark such that longitudinal axis of the wireless device matches the direction specified by the pointer; and
5) repeating steps 1)-4) until the next landmark is the destination.

In some embodiments, the automatic guidance method may further comprise a step between step 4) and 5) wherein the supra operation system issues graphic and sound instructions for the direction to be followed.

In some embodiments of the automatic guidance method, the standard mapping application may be selected from any one of Google Maps, Apple Maps, Yahoo! Maps, Bing Maps, MapQuest, OpenStreetMap, or Nokia Here.

In some embodiments of the automatic guidance method, the navigation module may receive positional information from GPS satellites, and in some embodiments, the navigation module may further receive positional information from A-GPS mobile stations. In some embodiments, the navigation module only receives positional information from A-GPS mobile stations where there is internet connectivity; yet in some other embodiments, the navigation module only receives positional information from GPS satellites where there is no internet connectivity.

In some embodiments of the automatic guidance method, the array of sensors may comprise a magnetometer sensor, a gyroscope sensor, an accelerometer sensor, a light sensor, a microphone sensor, a proximity sensor, and a pressure sensor. Yet in some other embodiments of the automatic guidance method, the array of sensors may further comprise a chemical sensor.

In some embodiments of the automatic guidance method, the landmark identifiers may be photos, videos, sound, or combinations thereof.

In some embodiments, the automatic guidance method may further comprise a step between 4) and 5) wherein a supra operation system switches landmark identifiers, as specified by a user. Yet in some other embodiments, the automatic guidance method may further comprise a step between 4) and 5) wherein a supra operation system switches display mode between a regular mode and a full-screen mode, as specified by a user.

DETAILED DESCRIPTION

The present disclosure relates to method and system for wireless monitoring, controlling and directing the movement of an object.

Some conventional systems work in situations where the user knows their final destination and then selects a route offered by the navigation systems depending on user preferences. If the user does not know their final destination, using such systems may locate the location of the user on a map, but the systems are unable to direct the user to a final destination because it is unknown.

In addition, such systems are unable to provide directions in the absence of mapped and/or named streets, roads, highways, freeways, etc. Such situations are frequently met outdoors, in wilderness, uninhabited mountain areas, undeveloped beach areas, backcountry and so on.

Other wireless navigation systems (e.g. EveryTrail) may suggest a final destination and/or a route to follow in unnamed areas (such as in outdoor sports, for example, hiking, mountain biking and the like). However, such final destinations and/or routes are proposed as routes according to the subjective criteria selected by users who in most cases are not local experts/professionals. Such routes were mapped and uploaded into the systems by the public at will, without final expert assessment for legitimacy of being desirable or the best routes.

Furthermore, the route maps offered by such systems do not provide automatic guidance to and along the final destination/route. It is left to the user to determine which direction to select using an additional device, such as a compass, in order to reach the final destination or follow the suggested route in the proper order. In addition, the routes are not broken into segments where each segment is measured depending on user location throughout the route for ease of navigation.

Moreover, there are wireless systems of navigation (for example, TripAdvisor City Guides), which suggest best final destinations/routes designed by experts that break the routes into segments and also provide landmark photos identifying where each particular segments starts. However, such systems do not provide automatic guidance relative to and along the final destination/route. A pointer to the final destination is sometimes provided, but such pointer is not on a map, leaving a user to guess what his/her location is. The user must switch between the screen with the pointer and the screen with a map and a compass. Furthermore, when a user is on and along the suggested route, the user's own (GPS defined) location is not indicated on the map, leaving the user to wonder whether he/she is following the suggested route in the proper order.

Also, such systems require an additional download from within the application for every desired route. Each route download creates another icon on smartphone thus clogging the devise with subset icons stemming from the original application.

Figure 1:
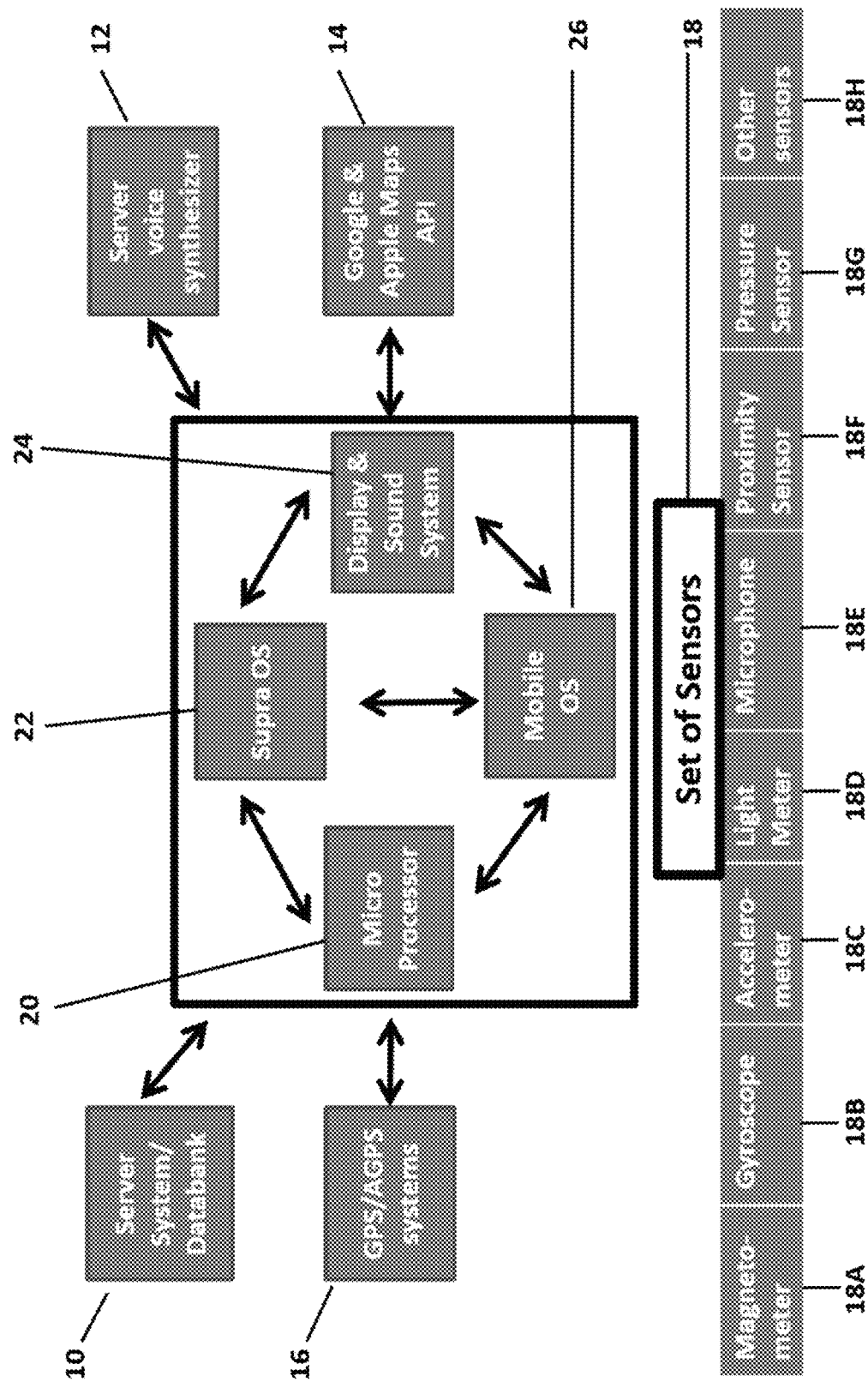
FIG. 1 is a block diagram of a wireless navigation system. The diagram shows the elements of the system and their mutual interactions.

FIG. 1 shows the following elements of a wireless automatic navigation system according to some embodiments: a system 10 of servers which contain a database of final destinations/routes information designed by local experts/professionals, including landmark identifications such as photos, videos and sound; a voice synthesizer 12 which can communicate oral instructions to a user; an API toolset 14 of a web mapping service application such as Google Maps and Apple Maps; a GPS/AGPS module/system 16 of satellites, servers and processing stations; a set 18 of, or an array of, sensors including the following: a magnetometer sensor 18A; a gyroscope sensor 18B; an accelerometer sensor 18C; a light sensor 18D; a microphone sensor 18E; a proximity sensor 18F; a pressure sensor 18G; a bank of additional sensors 18H; a microprocessor 20 such as those contained in portable wireless devices like smart phones, tablets, hybrid tablets/laptops and similar wireless devices; a mobile supra operating system (Supra OS) 22; a display and sound system 24 such as these contained in portable wireless devices like smartphones, tablets, hybrid tablets/laptops and similar wireless devices; a standard mobile operating system (OS) 26 such as Android, Symbian, Apple iOS, BlackBerry, MeeGo, Windows Phone, Bada or other. The product can be provided as an "app" on one or more of these operating systems.

Figure 2:
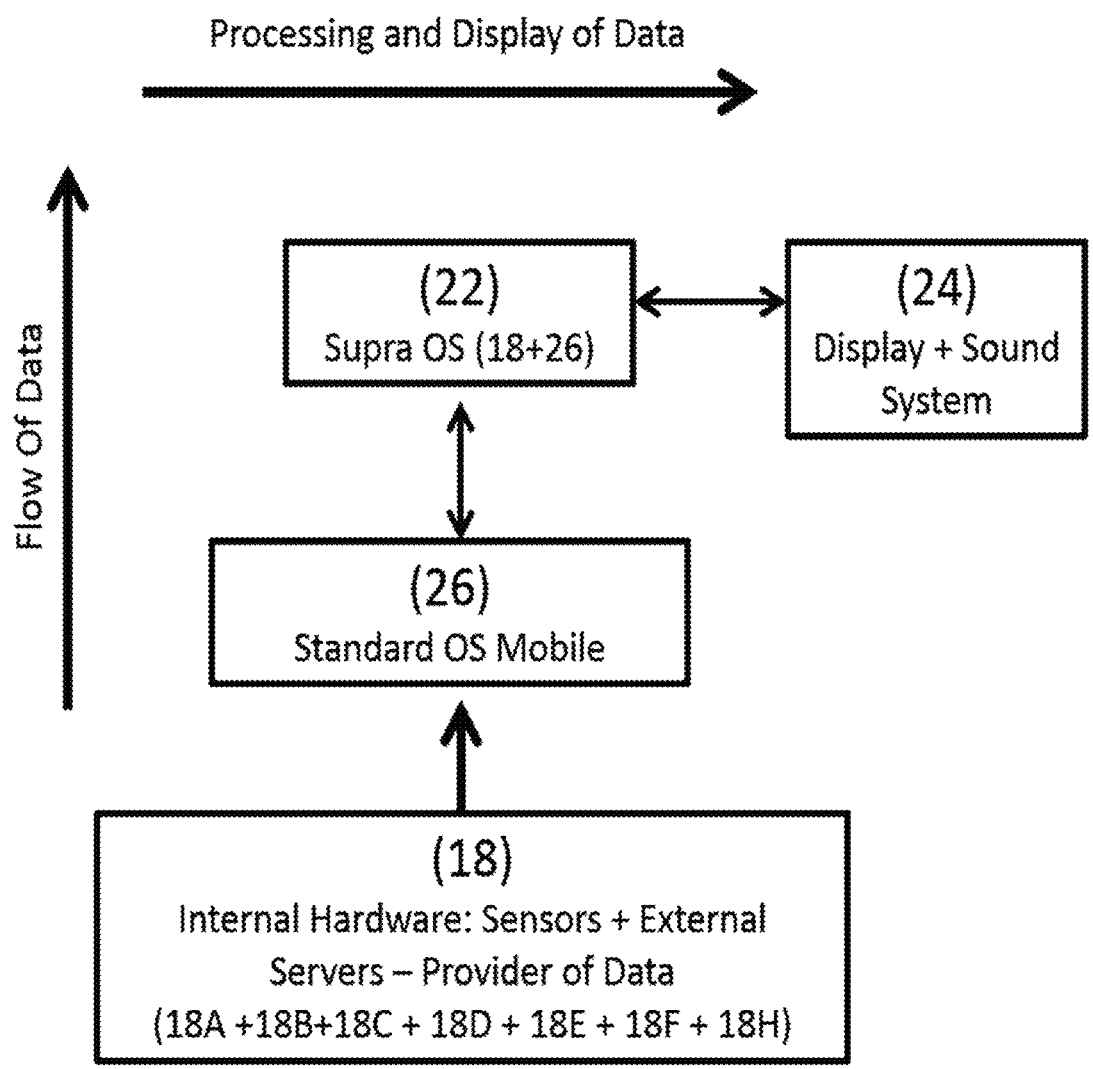
FIG. 2 shows flow of data in a wireless navigation system as illustrated in FIG. 1.
Figures 3A, 3B:
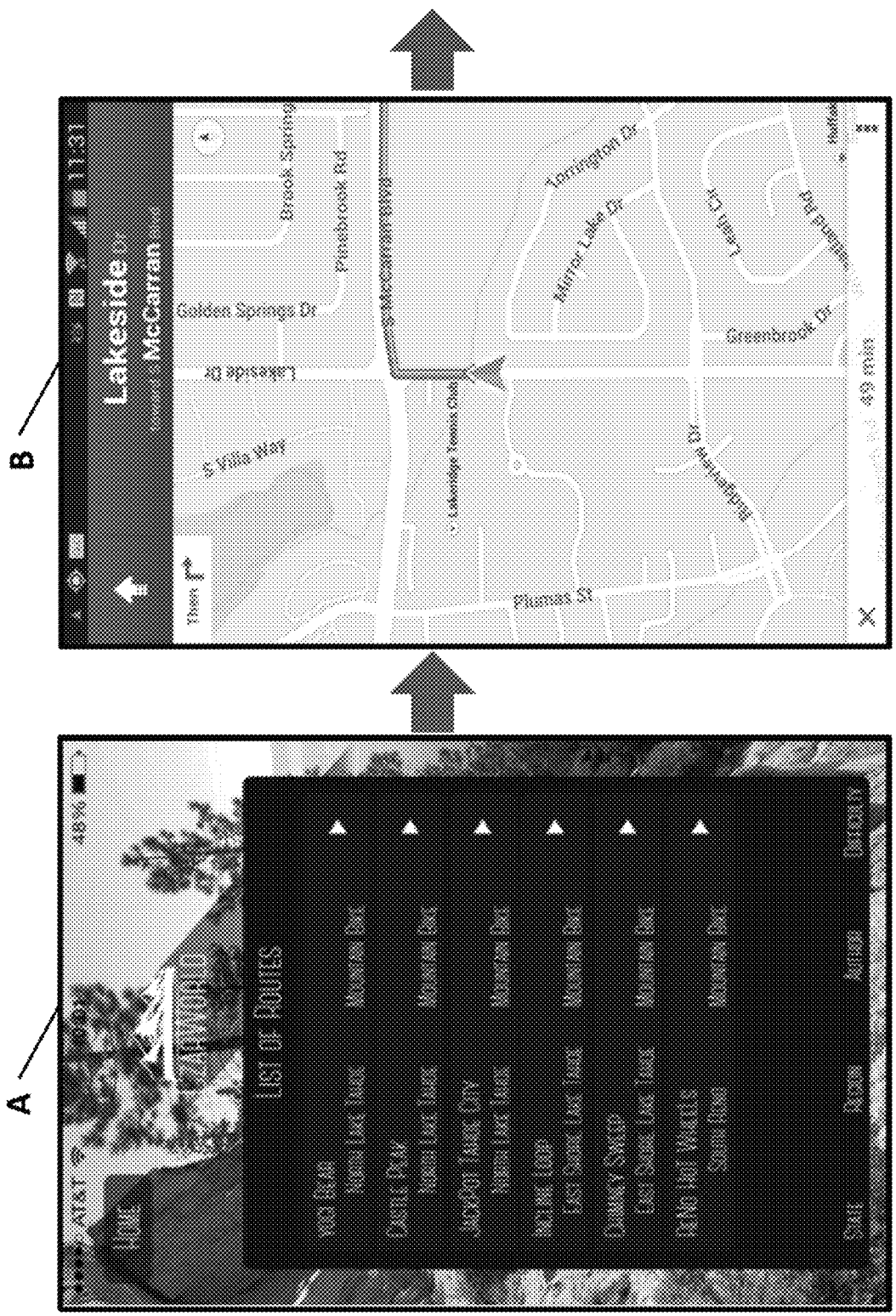
FIG. 3A illustrates a first navigational step for the system according to some embodiments.
FIG. 3B illustrates a second navigational step for the system according to some embodiments.
Figure 3D:
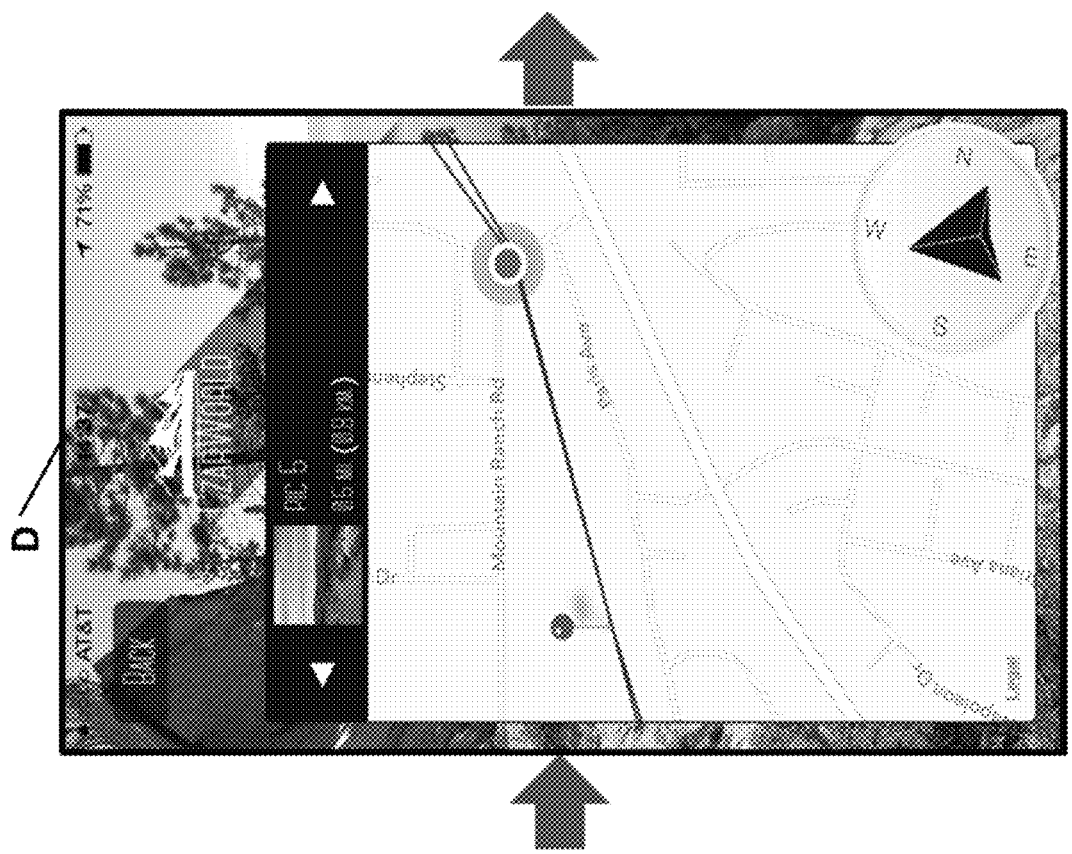
FIG. 3D illustrates a fourth navigational step for the system according to some embodiments.
Figure 3C:
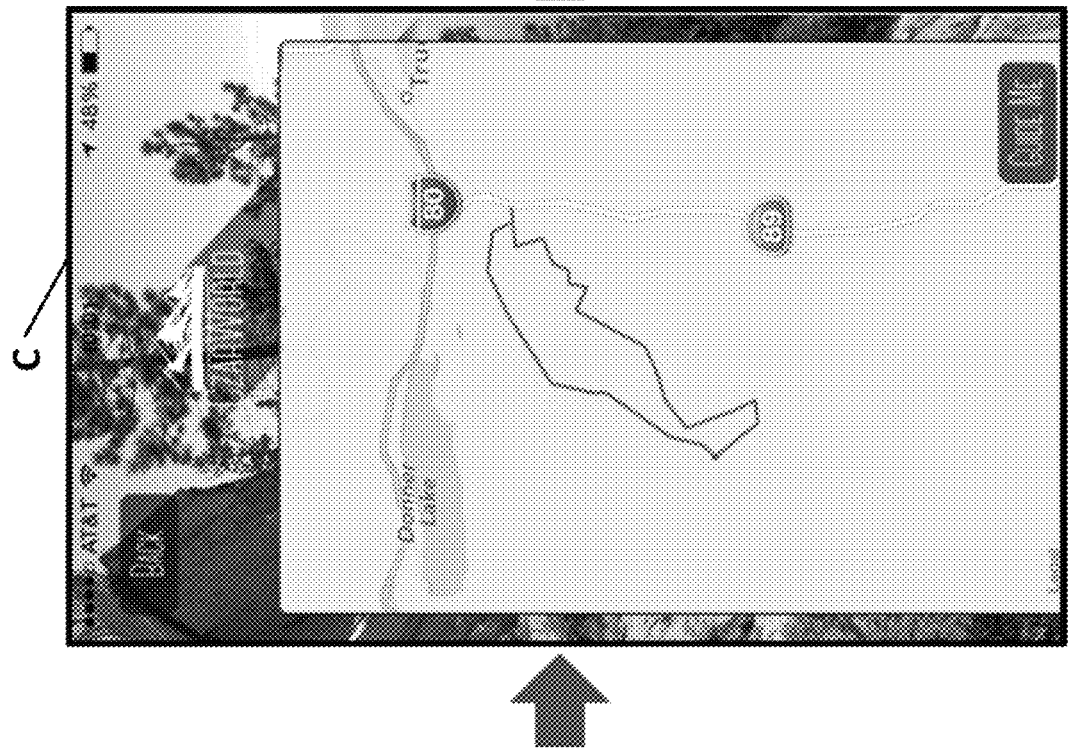
FIG. 3C illustrates a third navigational step for the system according to some embodiments.
Figure 3E:
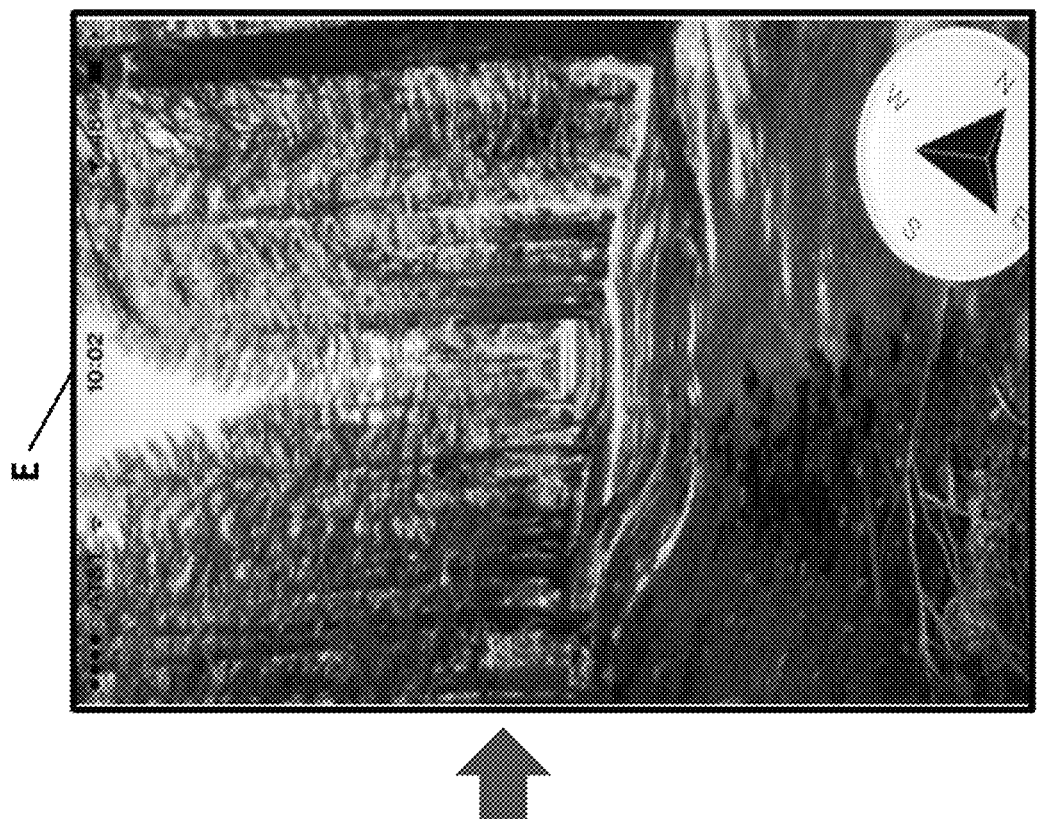
FIG. 3E illustrates a fifth navigational step for the system according to some embodiments.

FIG. 2 is a flowchart illustrating flow of data in a wireless automatic navigation system as illustrated in FIG. 1, where 18 is a set of hardware (containing 18A, 18B, 18C, 18D, 18E, 18F, and 18H), such as internal sensors and external servers which provide a flow of data to operating systems 26 and 22; 26 is a standard mobile operating system (standard OS) such as Android, Symbian, Apple iOS, BlackBerry, MeeGo, Windows Phone, Bada or other mobile operating system; 22 is a Supra OS which controls the standard OS 26 and the set of hardware 18; and 24 is a display and sound system which displays the final output of the system for the user.

FIGS. 3A-3E illustrate how a wireless automatic navigation system functions according to some embodiments, in which Supra OS 22 continuously controls the microprocessor 20 of the device, the standard OS 26, the set of sensors and servers 18A through 18H, signaling the microprocessor

20 to continuously calculate the location of a user relative to the final destination or along the route, and issuing graphic (via the pointer of the automatic guidance system) and sound instructions for the direction to be followed: A is a list of routes for the user to select from. B is a standard Google/Apple navigational system at the start of a user's journey to a final destination via a local expert-designed route. C illustrates an overview of the entire route. The 'guide me' button in the lower right portion of the screen initiates the applications' navigational function once user has arrived and is ready to undertake their selected route. D illustrates the location of a user along the route, with the automatic guidance system pointing in the direction in which the user should aim their phone. The red marker indicates user's current targeted checkpoint while the blue marker indicates the user's real-time location. The length of each segment(s) is displayed in the darker field above the route and is updated constantly for ease of navigation and real-time reassurance. A landmark picture indicating the start of the next segment or the end of previous segment (next blue or red balloon mark depending on the smart phone OS) is also displayed in the dark field. By clicking on the picture the user can see it in full-screen mode. A second click reduces it back to its original small size. The arrows on the two sides of the darker field allow the user to dial the next segment/landmark picture, forth or back. E is an example of a full-screen landmark geo-tagged photo that has been enlarged by the user.

Figure 4:
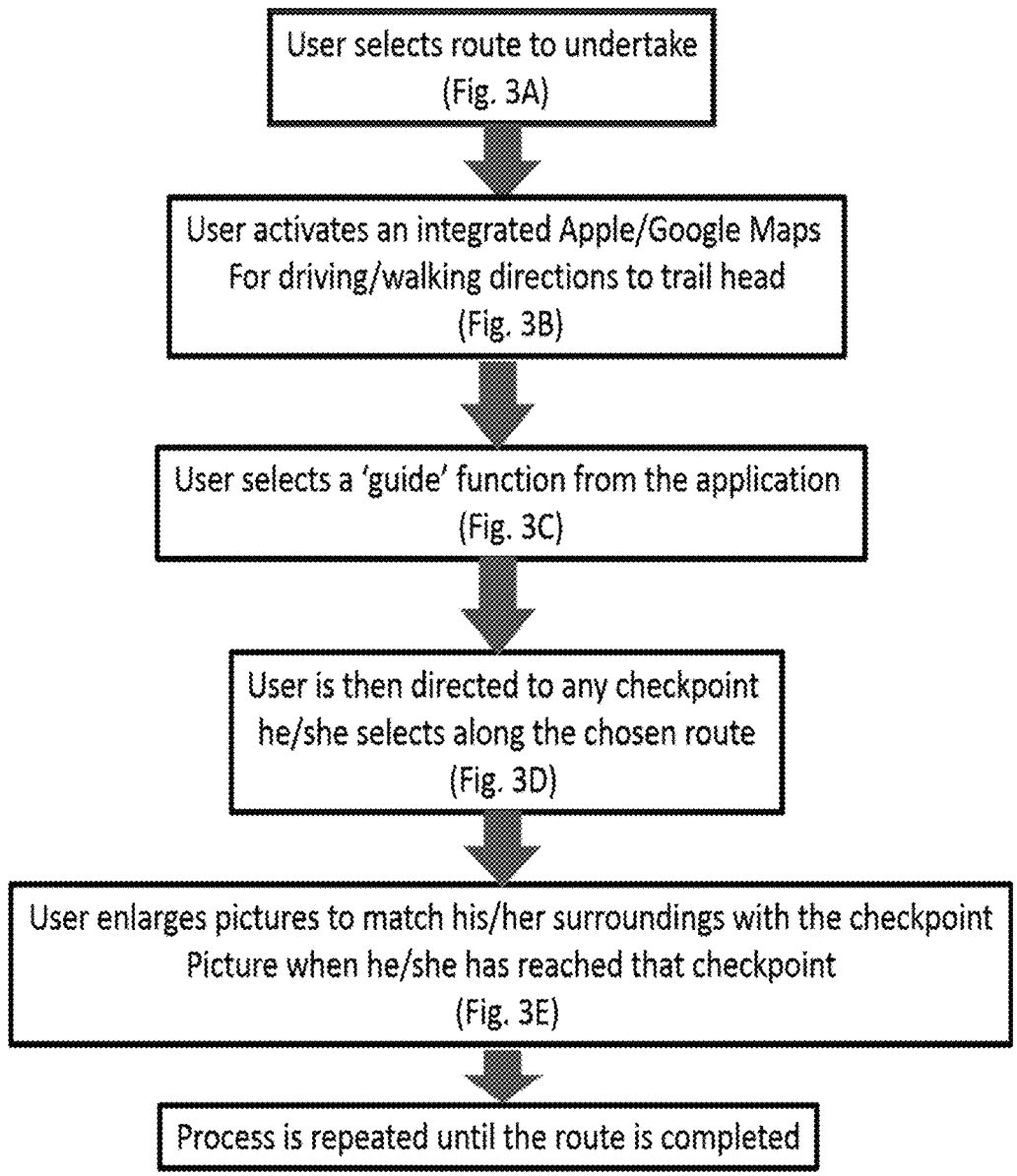
FIG. 4 is a flowchart of FIGS. 3A-3E illustrating a typical scenario of how a user uses the wireless automatic navigation system for guidance to a destination via a route previously designed by local experts.

FIG. 4 is the flowchart of FIGS. 3A-3E illustrating a typical scenario of how a user may use the wireless automatic navigation system: (1) user can select, among multiple local experts-designed routes to a particular destination, a route he/she may want to undertake; (2) user may activate an integrated Apple/Google Maps in his/her wireless device to obtain a specific driving/walking direction that he/she may trail ahead along the chosen route; (3) user may selects the "guide" button from the screen to start the automatic guidance system; (4) user is then directed by the system to drive/walk/bike/etc. towards any checkpoint he/she may select along the chosen route; (5) when user arrives at one place, he/she may enlarge the checkpoint picture to match his/her surroundings with the checkpoint picture to make sure that he/she has reached a particular checkpoint; (6) user may repeat (4) and (5) until he/she finally finishes the route and arrive at the destination.

Figure 5:
FIG. 5 illustrates an automatic guidance system according to some embodiments of the disclosure.

FIG. 5 illustrates an automatic guidance system according to some embodiments of the disclosure. The automatic guidance system is integrated and its pointer rotates independently within a compass. While the compass scale is always oriented North the pointer of the automatic guidance system rotates independently thus directing the user to the start of the selected next segment. This way the user simultaneously has information with regard to the directions to the destination and the specific direction to follow in order to reach the selected next checkpoint along the route or to the start of the route.

As such, FIGS. 3-5 make clear that no current navigational systems have an automatic guidance system to a final destination/route, which this embodiment has. Nor is the route followed segmented with each segment measured.

In one embodiment of the system, multiple routes are designed by local experts, landmarked by geo-tagged photos and videos and then uploaded into a system of servers 10 controlled by Supra OS 22. Employing servers containing Google Maps API and/or Apple Maps API 14 data and toolsets Supra OS 22 overlays the routes upon the standard mapping system such as Google Maps or Apple Maps, while at the same time assigning a serial number to the landmark photos and calculating the length of each segment marked by the photos.

Users who have downloaded the Supra OS 22 to their personal wireless devices can choose and download a route of interest, including landmark photos and videos with sound. By controlling the standard OS 26 residing in a wireless device, Supra OS 22 starts using the array of sensors contained in the wireless device including the magnetometer sensor 18*a*, the gyroscope sensor 18*b*, the accelerometer sensor 18*c*, the light sensor 18*d*, the microphone sensor 18*e*, the proximity sensor 18*f*, the pressure sensor 18*g*, and if needed the bank of additional sensors 18*h* (such as a chemical sensor for example to measure, display and announce the cleanness of the air) to calculate the specific GPS location of the user, such as his/her altitude, through the wireless device GPS/AGPS module 16, and then to relate that location to the particular route chosen.

In zones where no Internet connectivity is available the Supra OS 22 automatically switches off using the AGPS data and switches on using direct GPS data.

Once the user is on a selected route he/she has the capability to dial any of the landmark/checkpoints along the route. By reading the array of sensors, Supra OS 22 continuously calculates the location of the user in relation to the selected checkpoint on the route, displays a pointer directing the user on display 24, and issues sound instructions using voice synthesizer 12 directing the user to such point. In addition, the system may calculate, display and announce the altitude, the cleanness of the air, and other desired information collected and processed from the set of sensors, on demand by the user.

As will be appreciated by those of ordinary skill in the art, the present disclosure may be embodied as a method, a system, an apparatus, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., non-transitory computer readable medium) having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. An automatic guidance method employing a wireless automatic navigation device, the method comprising:
    obtaining a stored map from a standard mapping application;
    determining a current location of the wireless automatic navigation device on the standard mapping application based on received Global Positioning System (GPS) signals received via a navigation module of the wireless automatic navigation system;
    obtaining a route comprising a plurality of segments, and a plurality of landmarks including a final destination, from a private route database server,
    wherein the private route database server consists of expert information, wherein the expert information comprises complete specific routes that have been preauthorized by expert professionals registered with the database and who are located within a threshold geographical proximity to the specific routes;
    embedding the current location of the wireless navigation device, the destination, the route and the plurality of landmarks within the map of standard mapping application;
    identifying Global Positioning System (GPS) coordinates from the Global Positioning System signals for the plurality of landmarks from the private route database server;
    assigning serial numbers to each landmark of the plurality of landmarks as landmark identifiers;
    calculating a length of each one of the plurality of segments based on the current location of the wireless navigation device and each landmark identifier;

displaying the embedded current location of the wireless navigation device, the destination, the route comprising the plurality of segments, each landmark of the plurality of landmarks, and a pointer on the standard mapping application;

wherein the pointer is integrated within a Cartesian system for pointing a user in a real direction (North, South, West, East) to a next landmark of the plurality of landmarks;

wherein each landmark of the plurality of landmarks is presented as at least one of a photos, videos, or sound;

automatically navigating the user along each segment of the plurality of segments to the next landmark of the plurality of landmarks;

aligning the current position of the wireless navigation device with the pointer while moving towards the next landmark of the plurality of landmarks so that a longitudinal axis of the wireless navigation device matches a direction specified by the pointer; and repeating the above steps for each segment of the plurality of segments and for each landmark of the plurality of landmarks until the landmark of the plurality of landmarks is identified as the final destination.

* * * * *